United States Patent [19]

Ikeuchi

[11] Patent Number: 5,030,825
[45] Date of Patent: Jul. 9, 1991

[54] ROTATIONAL ANGLE DETECTOR HAVING GROUNDED SLIT PLATE

[75] Inventor: Masayuki Ikeuchi, Himeji, Japan
[73] Assignee: Mitsubishi Denki K.K., Tokyo, Japan
[21] Appl. No.: 493,532
[22] Filed: Mar. 14, 1990
[30] Foreign Application Priority Data Mar. 15, 1989 [JP] Japan .................................. 1-60710

[51] Int. Cl.$^5$ .............................................. G01D 5/34
[52] U.S. Cl. .......................... 250/231.14; 250/237 G
[58] Field of Search ..................... 250/231.13, 231.14, 250/231.16, 231.17, 237 G; 341/13; 324/175

[56] References Cited

U.S. PATENT DOCUMENTS

| 4,342,909 | 8/1982 | Accattino | 250/231.14 |
| 4,775,787 | 10/1988 | Ushiyama | 250/231.14 |
| 4,906,838 | 3/1990 | Sogabe et al. | 250/231.14 |
| 4,943,717 | 7/1990 | Ikeuchi et al. | 250/231.17 |

FOREIGN PATENT DOCUMENTS 58-14012  1/1983  Japan .

Primary Examiner—David C. Nelms
Attorney, Agent, or Firm—Sughrue, Mion, Zinn Macpeak & Seas

[57] ABSTRACT

A rotational angle detector provided in an engine ignition distributor. Light emitting and the light receiving sections are disposed in opposed positions on the two sides of a disk fixed to a rotary shaft, and a pair of slit plates are respectively disposed in front of the light emitting and the light receiving sections with the disk interposed between the slit plates. At least one of the slit plates is formed of an electroconductive material and is grounded.

5 Claims, 2 Drawing Sheets

ROTATIONAL ANGLE DETECTOR HAVING GROUNDED SLIT PLATE

BACKGROUND OF THE INVENTION

1. Field of the Invention

This invention relates to a rotational angle detector suitable for use in an ignition system for an internal combustion engine.

2. Description of the Related Art

FIG. 1 schematically shows a conventional rotational angle detector in which a disk 2 is fixed to a shaft 1 which is rotated in synchronism with the rotation of an internal combustion engine. A light emitting element 3 and a light receiving element 4 are disposed in opposed positions with the disk 2 interposed therebetween. The light emitting element 3 and the light receiving elements 4 are mounted in respective box-like holders 5 and 6 formed of a plastic each having a front opening at which a plate 7 or 8 having slits is disposed. The slits of the plates 7 and 8 are aligned with each other.

The thus-constructed rotational angle detector is disposed in an ignition distributor of an internal combustion engine. As the disk 2 is rotated with the rotation of the shaft 1 based on the rotation of the engine, light emitted from the light emitting element 3 is intermittently introduced into the light receiving element 4. A signal outputted from the light receiving element 4 is processed in a processing circuit (not shown) in order to detect the angle of rotation of the shaft 1. The detected angle is used as a reference angle during engine ignition timing control.

During use of this conventional rotational angle detector in the ignition distributor, there exist a possibility of a high voltage being induced in the shaft and the disk 2 due to a discharge from a distributor rotor electrode and, hence, the possibility of the induction of this induced voltage in the signal processing circuit of the rotational angle detector, resulting in a malfunction of the signal processing circuit. To cope with this problem, a shield (e.g., shielding plates 15) for shutting off electromagnetic induction, i.e., voltage induction from the shaft 1 and the disk 2 to the signal processing circuit is ordinarily provided outside the rotational angle detector.

However, the gap between the slit plates in this specific construction of the detector is small and it is not possible to provide a shielding plate at this position. In addition, the slit plates 7 and 8, which are fixed to the plastic holders 5 and 6, are electrically floating and it is therefore difficult to remove electromagnetic charge thereon, which may cause noise by entering via this position.

SUMMARY OF THE INVENTION

In view of these problems, an object of the present invention is to provide a rotational angle detector free from malfunctions owing to electromagnetic induction via the position of the slit plates.

To this end, the present invention provides a rotational angle detector including: a disk fixed to a rotary shaft, said disk having a plurality of slits formed therethrough; a pair of light emitting and light receiving sections disposed in opposed positions on the two sides of the disk; a pair of slit plates respectively disposed in front of the light emitting and light receiving sections with the slits interposed therebetween, at least one of the slit plates being formed of an electroconductive material; and a grounding means for grounding the slit plate formed of the electroconductive material.

In accordance with the present invention, at least one of the slit plates is formed of an electroconductive material and is grounded, thereby removing noise waves which may enter via the slit plates.

These and other features of the present invention will be readily apparent from the following description.

DESCRIPTION OF THE PREFERRED EMBODIMENT

Figure 1:
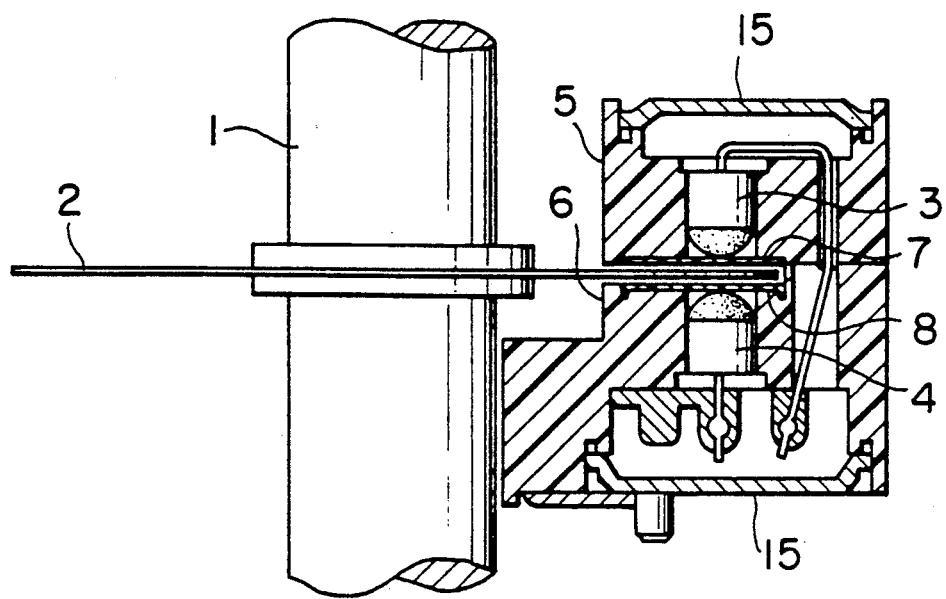
FIG. 1 is a schematic cross-sectional view of a conventional rotational angle detector.
Figure 2:
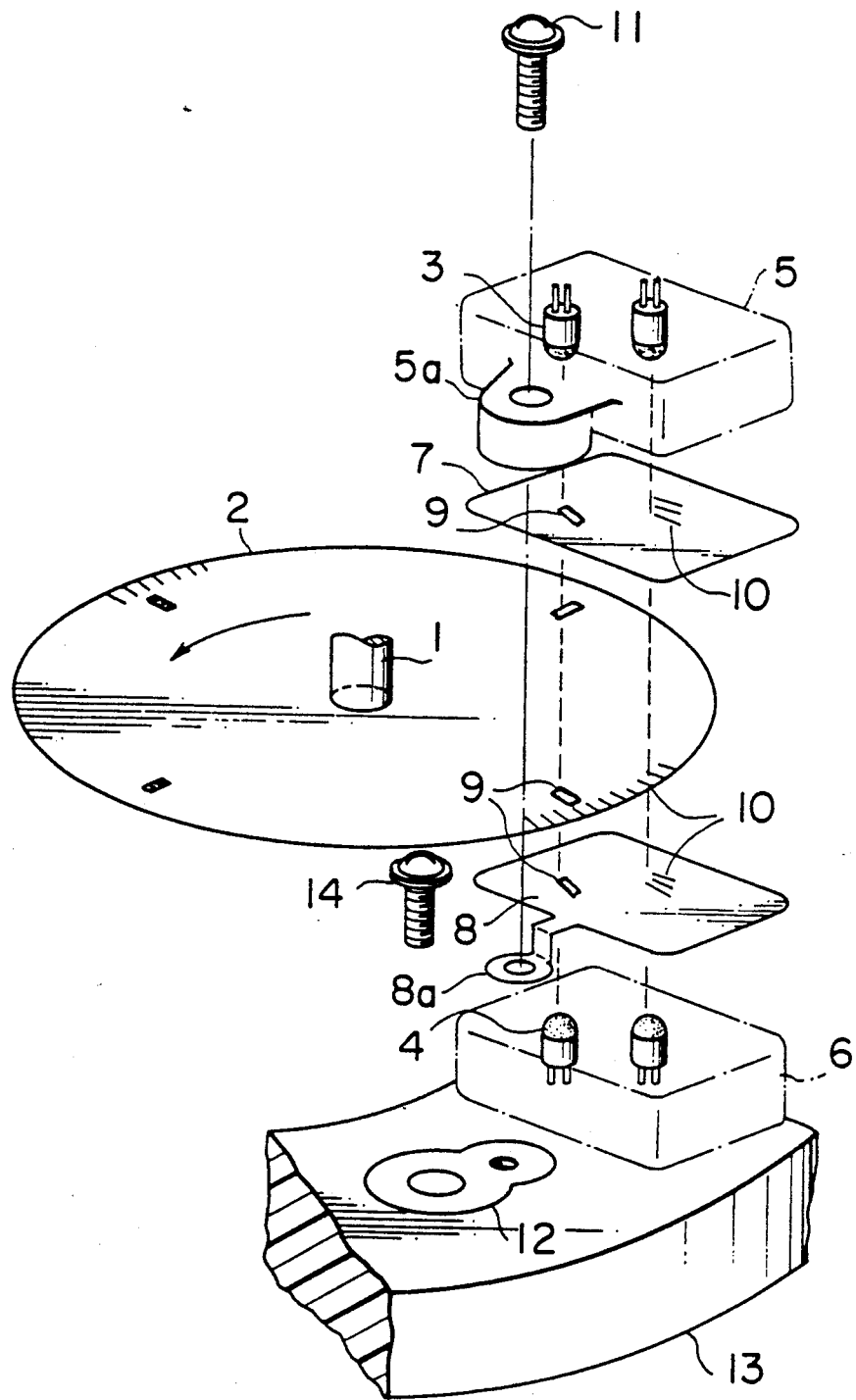
FIG. 2 is an exploded perspective view of a rotational angle detector which represents an embodiment of the present invention.

Referring to FIG. 2, in a rotational angle detector which represents an embodiment of the present invention, a disk 2 and a pair of slit plates 7 and 8 having slits 9 formed in alignment with each other for obtaining a reference signal, and slits 10 formed in alignment with each other for obtaining an angle signal. The slit plate 8 disposed on the side of a light receiving element 4 is formed of an electroconductive material and has a grounding terminal 8a. A light emitting section holder 5 has a screw hole portion 5a. The shape of the screw hole portion 5a may be such that the light emitting section holder 5 can be fixed on a light receiving section holder 6 by fastening with a screw 11 so that a gap in which the disk 2 is rotatably inserted is formed between the pair of slit plates 7 and 8. The light emitting section holder 5 having the screw hole portion 5a and the terminal 8a are fixed together with a grounding terminal plate 12, on the light receiving holder 6, i.e., a detector unit case 13 by the screw 11 formed of an electroconductive material. That is, the screw 11 has a function of fixing the holders and a function of grounding the slit plate 8. A fixing screw 14 is provided for connection of a grounding conductor (not shown) to the grounding terminal 12. The grounding conductor may be directly connected to the screw 11. In this construction, the shielding extends to the position of the slit plates 7 and 8, thereby removing electromagnetic waves which may cause noise by entering via this position.

In the above-described embodiment, the slit plate 8 on the side of the light receiving element 4 is grounded. However, the arrangement may alternatively be such that the slit plate 7 on the side of the light emitting element 3 or both the slit plates 7 and 8 are formed of an electroconductive material and are grounded. For grounding, the conductive slit plate 7 may be provided with a terminal portion in the form of a ring, such as that shown in FIG. 2, through which the screw 11 is inserted. A different type of terminal portion which can be simply connected to the screw 11 can also be used.

In accordance with the present invention, as described above, it is possible to prevent induction of noise via the slit plates portion by the effect of a simple structure in which at least one of the pair of slit plates disposed on the opposite sides of the disk between the light emitting element and the light receiving element is formed of an electroconductive material and is grounded.

What is claimed is:

1. A rotational angle detector comprising:

a disk fixed to a rotary shaft, said disk having a plurality of the slits formed therethrough;

a pair of light emitting and light receiving sections disposed in opposed positions on the two sides of said disk;

a pair of slit plates respectively disposed in front of said light emitting and light receiving sections with said slits interposed therebetween, at least one of said slit plates being formed of an electroconductive material; and grounding means for grounding said slit plate formed of the electroconductive material, wherein said light emitting section incorporates a light emitting element and has a light emitting section holder having a screw hole portion; said light receiving section incorporates a light receiving element and has a light receiving section holder having a screw hole portion; at least one of said slit plates is formed of an electroconductive material and has a terminal portion in the form of a ring, said slit plates being respectively fixed in front of said light emitting section holder and said light receiving section holder; said grounding means includes a screw formed of an electroconductive material, said screw being inserted in said screw hole portions of said light emitting section holder and said light receiving section holder, and said screw contacting said terminal portion of said slit plate while passing therethrough; said light emitting section holder and said light receiving section holder being fixed so that said disk is rotatably interposed between said pair of slit plates; and said slit plate formed of the electroconductive material is grounded.

2. A rotational angle detector according to claim 1, wherein said rotational angle detector is disposed inside an engine ignition distributor.

3. A rotational angle detector according to claim 2, wherein each of said pair of slit plates is formed of an electroconductive material and is grounded by said grounding means.

4. A rotational angle detector according to claim 1, wherein said light receiving section holder is fixed on an unit case having a screw hole portion, and said screw is inserted in said screw hole portions of said light emitting section holder and said unit case and passes through said terminal portion of said electroconductive slit plate while contacting the same to fix said light emitting section holder and said light receiving section holder and to ground said electroconductive slit plate.

5. A rotational angle detector according to claim 4, wherein said slits for a reference signal and slits for an angle signal are respectively formed in said disk and said pair of slit plates.

* * * * *